United States Patent

[11] 3,590,360

| [72] | Inventor | Charles M. Puckette |
| | | Mont Vernon, N.H. |
| [21] | Appl. No. | 776,551 |
| [22] | Filed | Nov. 18, 1968 |
| [45] | Patented | June 29, 1971 |
| [73] | Assignee | Sanders Associates, Inc. |
| | | Nashua, N.H. |

[54] HIGH EFFICIENCY AC VOLTAGE REGULATOR
10 Claims, 8 Drawing Figs.

[52] U.S. Cl. .................................................. 321/18
[51] Int. Cl. ............................................... H02m 1/08
[50] Field of Search ........................................ 321/16, 18;
323/22 SC, 22 T

[56] References Cited
UNITED STATES PATENTS

| 3,068,392 | 12/1962 | Santelmann, Jr. | 321/18 |
| 3,244,965 | 4/1966 | Gutzwiller | 321/18 X |
| 3,354,380 | 11/1967 | Fly et al. | 321/18 |
| 3,372,326 | 3/1968 | Stefanov | 321/18 X |
| 3,466,527 | 9/1969 | Ping Sun Chun | 321/18 X |

OTHER REFERENCES

IBM TECHNICAL DISCLOSURE BULLETIN, " DC To DC Converter," Vol. 6, No. 10, March, 1964, 321/18

Primary Examiner—William M. Shoop, Jr.
Attorney—Louis Etlinger

ABSTRACT: A voltage regulator serving a DC power supply controls the peak voltage of an input AC waveform by momentarily opening a switch connected in series with the AC source during periods when the input voltage exceeds a desired reference voltage related to the output voltage of the supply. The action of the switch creates notches centered in each half cycle of the AC waveform whose width is inversely related to the magnitude of the peak voltage applied to the DC supply and to the output voltage applied to the load. Control of the average or RMS voltage, as well as random peak voltages, may also be accomplished using a similar technique.

INVENTOR.
CHARLES M. PUCKETTE

INVENTOR.
CHARLES M. PUCKETTE
BY
ATTORNEY

INVENTOR.
CHARLES M. PUCKETTE
BY
ATTORNEY

HIGH EFFICIENCY AC VOLTAGE REGULATOR

The invention herein described was made in the course of or under a contract or subcontract thereunder with the Department of the Navy.

BACKGROUND OF THE INVENTION

1. Field of the Invention

This invention relates generally to regulated power supplies. It relates more particularly to an improved voltage regulator for compensating a DC power supply for changes in the line voltage as well as changes in a load connected to the power supply.

2. Description of the Prior Art

There are in the art innumerable voltage regulators for controlling the output of a DC power supply. Generally, these may be broken down into three different types. First, there are those that employ a silicon controlled rectifier which responds to the magnitude and/or phase of an AC input signal with reference to the magnitude of a DC load voltage. An example of this type of regulator is shown in U.S. Pat. No. 3,185,912. Regulators of this first type are disadvantaged because they do not control the peak voltage of the AC waveform efficiently and with good power factor. Consequently, they cannot be used effectively with DC power supplies employing peak rectification. Also, this type of regulator generates considerable radiofrequency interference which may adversely affect sensitive electronic equipment associated with the DC supply.

The second type of regulator employs a ferroresonant element whose series impedance varies with the load current. However, this regulator is frequency sensitive. Also, the ferroresonant element adds considerable weight and bulk to the overall system, so that the regulator is not suitable for use in relatively small systems.

The third type of regulator uses a magnetic amplifier and therefore also suffers because of excessive size and weight.

SUMMARY OF THE INVENTION

Accordingly, it is an object of the present invention to provide a voltage regulator which is efficient and has a good power factor.

Another object of the invention is to provide a voltage regulator which is substantially insensitive to fluctuations in line frequency.

Still another object of the invention is to provide a voltage regulator which is relatively small and lightweight and, therefore, may be used with small electronic systems.

Another object of the invention is to provide a voltage regulator specifically designed for use with DC power supplies employing either peak, average, or RMS rectification.

Another object is to provide a regulated DC power supply which generates a minimum amount of radiofrequency interference.

A further object of the invention is to provide a regulated DC power supply which delivers a precisely controlled DC signal.

Another object of the invention is to provide means for controlling the peak value of an AC waveform.

Still another object is to provide a regulated DC supply which costs relatively little to make and maintain.

Other objects of the invention will in part be obvious, and will in part appear hereinafter.

The invention accordingly comprises the features of construction, combination of elements, and arrangement of parts which will be exemplified in the construction hereinafter set forth, and the scope of the invention will be indicated in the claims.

Briefly, my improved regulated supply includes a regulator connected between an AC source and a DC power supply which is, in turn, connected to a load. The AC input is fed to the regulator where it is clipped to convert it to a clipped waveform; it is then integrated and finally rectified, thereby producing a signal having a triangular waveform and a basic frequency of twice the input frequency. The valleys (negative peaks) of this triangular waveform roughly coincide with the positive and negative peaks of the AC input.

The signal is compared with a DC control voltage derived from the load voltage to develop a difference signal which controls a switch connected in series between the source and the supply. The regulator opens the switch once during each half cycle of the AC input during the interval when the voltage of the triangular waveform is below the DC control voltage. The action of the switch creates a notch in each half cycle of the AC input voltage to the DC supply. The magnitude of the peak input voltage of the signal applied to the DC supply, and also the DC output across the load are inversely related to the notch width.

The regulator provides for removing changes in the DC output level due to changes in line voltage or in load characteristics by making the control voltage responsive to changes in the DC output. This affects the proportion of the triangular waveform that falls below the control voltage and, varies the notch width to maintain a substantially constant voltage across the load.

Similarly, the above techniques may be used to control the average or RMS voltage as well as random peak voltages.

The present regulator is constructed of relatively few, conventional, inexpensive electrical components. Also, the system is simple to operate and needs no expensive maintenance. Moreover, the regulated power supply, as a whole, is relatively small and lightweight since it requires no heavy inductive elements. Also, it is relatively efficient, produces a minimum amount of radiofrequency interference, and is relatively insensitive to changes in frequency.

BRIEF DESCRIPTION OF THE DRAWINGS

For a fuller understanding of the nature and objects of the invention, reference should be had to the following detailed description taken in connection with the accompanying drawings, in which.

Figure 5:
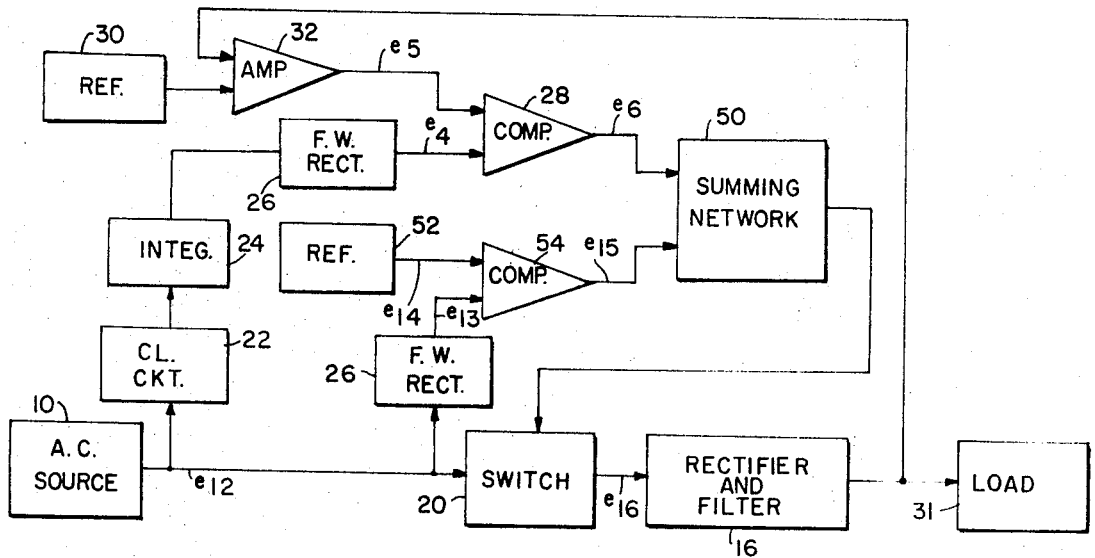
FIG. 5 is a schematic diagram of a regulated power supply employing peak rectification, as well as control of random peak voltages.
Figure 7:
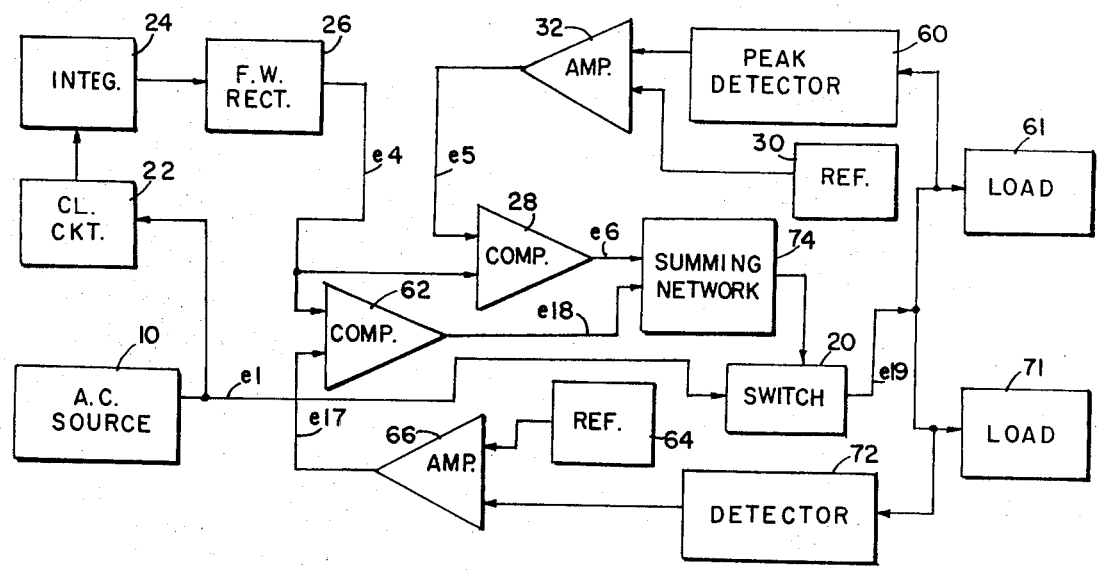
Figure 8:
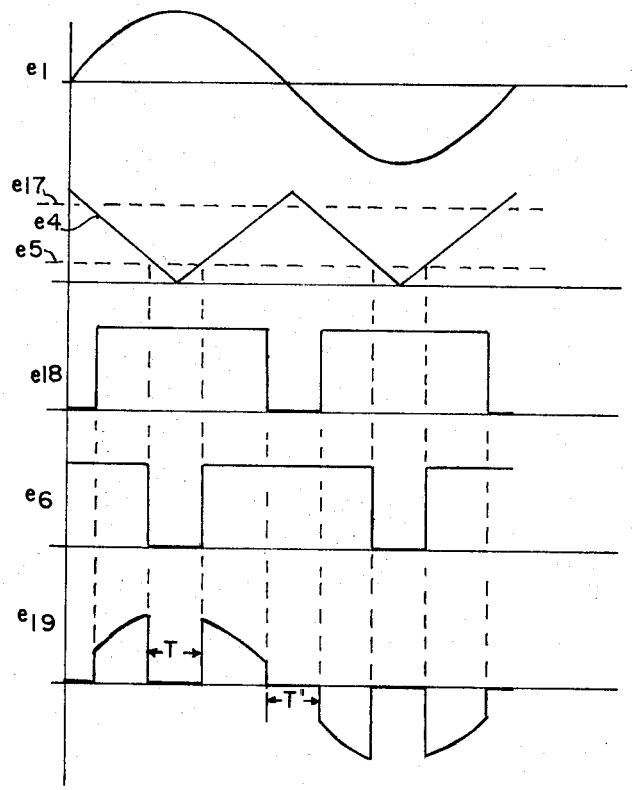

FIG. is a timing diagram illustrating the operation of the FIG. 5 system;

FIG. 7 is a schematic diagram of a regulated power supply employing peak rectification and, in addition, in combination therewith, a regulated power supply employing average or RMS rectification;

FIG. 8 is a timing diagram illustrating the operation of the FIG. 7 system.

DESCRIPTION OF THE PREFERRED EMBODIMENT

Figure 1:
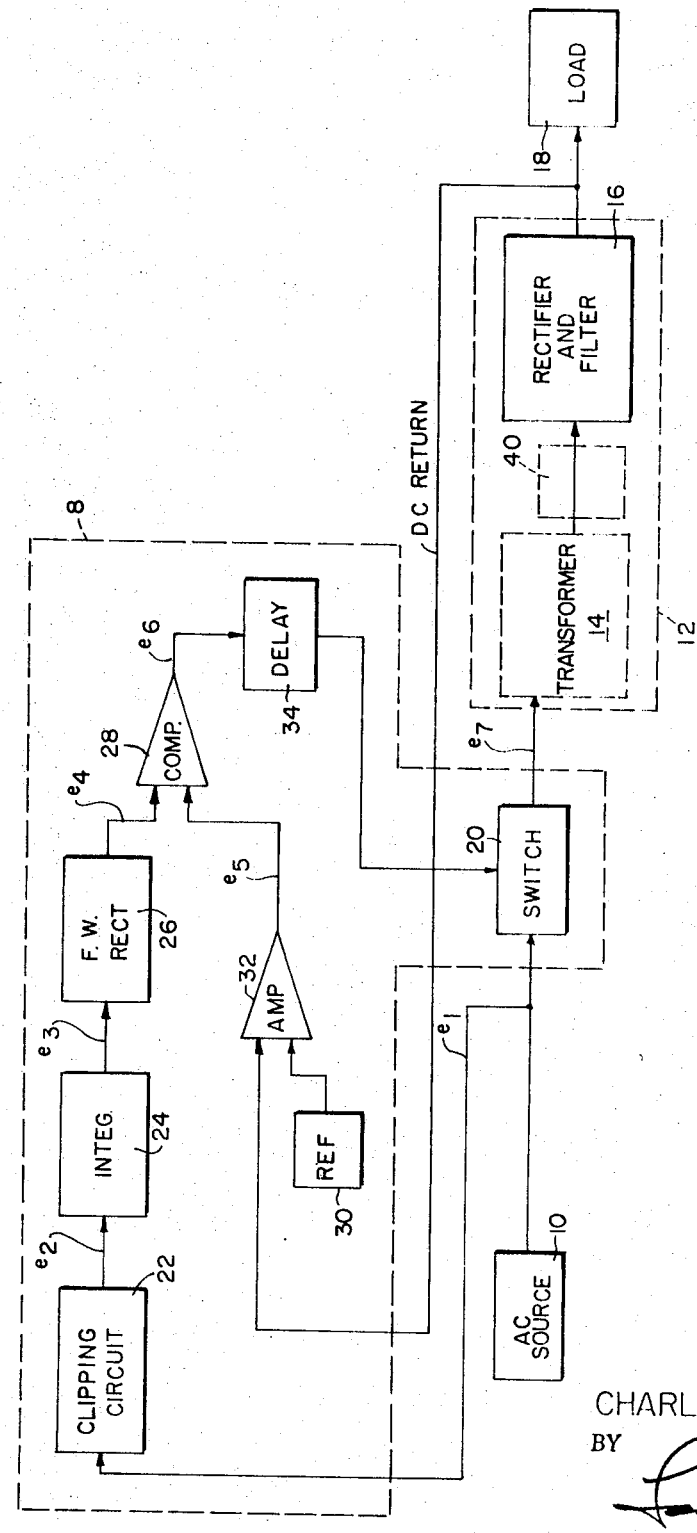
FIG. 1 is a schematic diagram of a regulated power supply employing peak rectification and embodying the principles of my invention.

Referring to FIG. 1, a regulator 8 is connected between an AC source 10 and a conventional DC power supply 12 employing peak rectification. Power supply 12 comprises the usual rectifier and filter 16, and may include a transformer 14. The output of power supply 12, is in turn, applied to a load 18.

Regulator 8 comprises a switch 20, such as a conventional transistor switch, connected in series between source 10 and the power supply 12. Regulator 8 controls the peak voltage of the AC input $e_7$ to power supply 12 by opening switch 20 during the periods when the input AC voltage $e_1$ exceeds a predetermined value.

Figure 2:
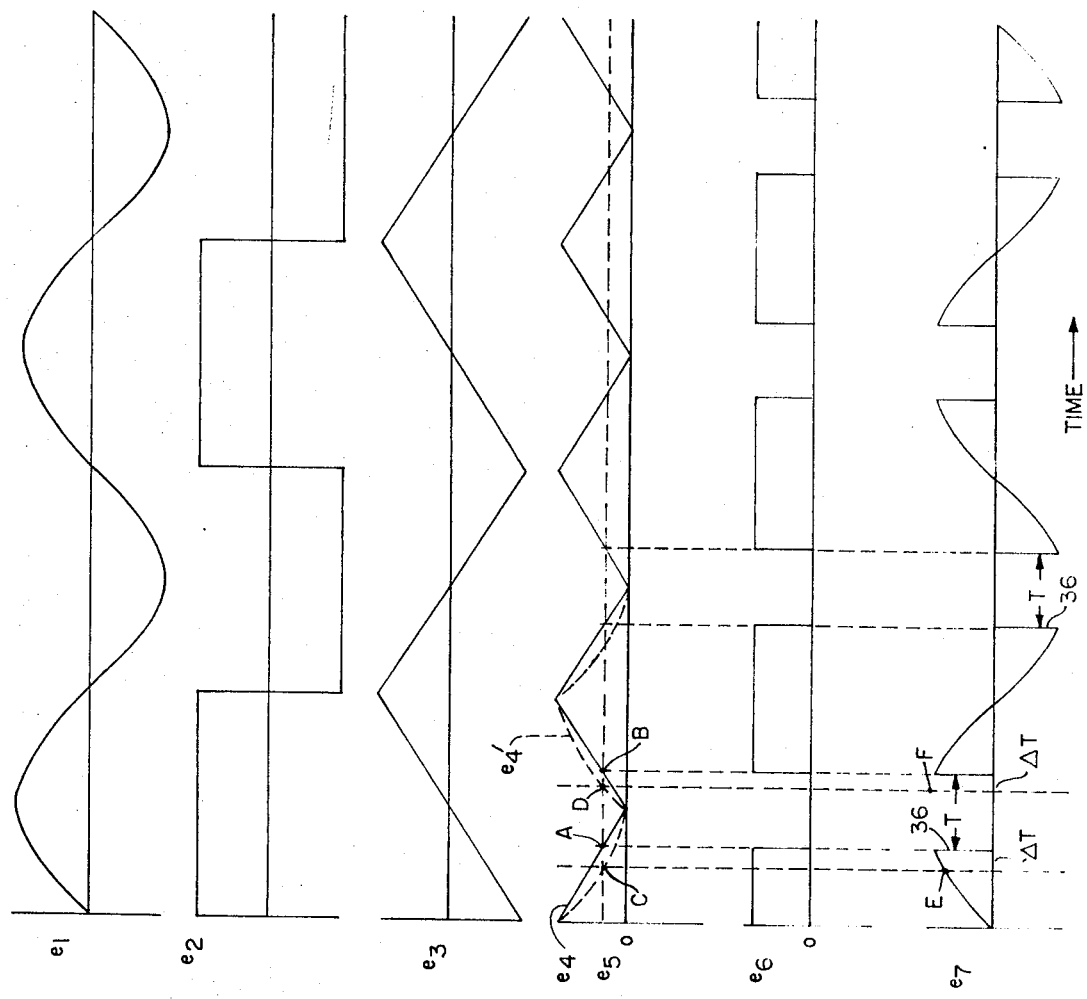
FIG. 2 is a timing diagram illustrating the operation of various components of the FIG. 1 system.

More particularly, and referring to FIGS. 1 and 2, the AC input from source 10, illustrated by the voltage curve $e_1$ in FIG. 2, is applied to a clipping circuit 22 in regulator 8 where it is converted to the clipping waveform as shown by voltage curve $e_2$. The clipped signal is then applied to an integrator 24 which develops a train of positive and negative going voltage ramps illustrated by voltage curve $e_3$, in FIG. 2. Following this, the $e_3$ signal is rectified by a conventional full wave rectifier 26 whose output is a timing signal having a triangular waveform, as illustrated by curve $e_4$ in FIG. 2. As seen from that figure, the $e_4$ signal reaches its valley (negative peaks) at the times of each positive and negative peak of the AC input voltage $e_1$. In other words, every other peak (the more positive peaks) of the $e_4$ triangular waveform occurs at the same times as the axis crossings of the AC input voltage $e_1$.

The $e_4$ signal is applied to a comparator 28 which compares that signal with a DC control voltage $e_5$. The $e_5$ voltage is indicative of the DC voltage across load 18, and $e_5$ has a preselected value when the voltage across the load 18 is at the desired value. More particularly, a DC reference source 30, a Zener diode arrangement, applies a DC reference signal to a differential amplifier 32. Also, the output voltage from supply 12 is applied either directly, or by way of a voltage divider, as a DC return signal to amplifier 32. The difference signal from amplifier 32 constitutes the DC control voltage $e_5$ which is applied to comparator 28.

The output of comparator 28 switches between 0 volts and a constant level once each half cycle of AC waveform $e_1$, as is shown in voltage curve $e_6$ in FIG. 2. This constant level of voltage $e_6$ is present only when the instantaneous magnitude of the signal $e_4$ exceeds the $e_5$ control voltage. Voltage $e_6$ is applied to control switch 20. A delay circuit 34 may be connected between comparator 28 and switch 20 as will later be described. During the portion of each half cycle of the AC input voltage $e_1$, when comparator 28 emits an output $e_6$ of 0 volts, switch 20 is turned off. This interrupts the AC input voltage $e_1$ applied to power supply 12 from source 10 as indicated by voltage curve $e_7$ in FIG. 2. More particularly, regulator 8 creates a notch 36 substantially centered in each half cycle of the AC input voltage $e_1$. The magnitude of the resulting peak voltage of $e_7$ is inversely related to the notch width T. In fact, it can be shown that the peak voltage of the $e_7$ input to supply 12 is a linear function of the notch width T.

Also, when power supply 12 employs peak rectification, the output voltage across load 18 is substantially equal to the peak voltage of the $e_7$ input to the power supply. Therefore, it too is a function of notch width T. By properly varying the notch width T, regulator 8 provides a substantially constant DC output to load 18 despite relatively large changes in the AC input voltage or in the characteristics of load 18.

The reference source 30 is adjusted to provide a notch width T which will yield an AC input $e_7$ for power supply 12 having the proper peak voltage to provide the desired DC output across load 18. If this load voltage changes from the desired value due to fluctuations in the AC input voltage or to changes in load 18, a change in the return signal applied to amplifier 32 shifts the control voltage $e_5$ up or down to vary the notch width T as needed to restore the correct output level.

For example, referring to FIG. 2, a voltage increase at load 18 increases the voltage $e_5$ relative to the triangular waveform $e_4$ so that a larger proportion of waveform $e_4$ lies below level $e_5$. This makes the 0 level of voltage $e_6$ longer in duration so that the switch 20 is turned off for a longer interval during each half cycle of the AC input voltage $e_1$. This increase in the notch width T proportionately reduces the peak value of the voltage $e_7$ applied to power supply 12, thereby restoring the DC voltage across load 18 to the desired value.

Conversely, if the DC output voltage to load 18 should drop below its proper value, the change in the return signal will decrease the control voltage $e_5$, thereby reducing the notch width T and increasing the peak value of voltage $e_7$ applied to supply 12 to restore the correct DC output to load 18. In this fashion, the regulator closely controls the output voltage to maintain a relatively constant DC level.

The regulator 8 is substantially independent of changes in the frequency of the AC input voltage $e_1$ from source 10. This is because the frequency of the $e_4$ signal and the absolute slope of the voltage ramps therein vary with AC input frequency. That is, as the AC input frequency increases, the frequency of the $e_4$ signal increases correspondingly so that its valleys still correspond with the peaks of the AC input voltage $e_1$. Also, the proportion of the $e_4$ signal below the $e_5$ line remains substantially the same. As a result the notches T are still centered in each half cycle of the voltage $e_7$ and, though smaller in width, they still yield substantially the same peak voltage of the voltage $e_7$. Similarly, a decrease in AC input frequency results in centered notches which are correspondingly wider. Thus, the peak voltage of the AC input voltage $e_7$ to supply 12 remains substantially constant and therefore so does the output voltage across load 18.

In the above discussion, we have assumed that the voltage waveforms $e_3$ and $e_4$ have constant absolute slopes. In actual practice, however, this may not be the case. Due to the processing of the $e_2$ signal by integrator 24, the voltage ramps from rectifier 26 may be nonlinear and actually look like waveform $e_4'$ in FIG. 2. This nonlinearity has the effect of advancing the difference signal for switch 20 in time so that switch 20 turns off and on prematurely, with the result that notches 36 would not be centered in the half cycles of the AC voltage $e_7$.

To illustrate, in the ideal case the waveform $e_4$ intercepts level $e_5$ at points A and B. In the example, however, the $e_4$ waveform intercepts the $e_5$ level at points C and D positioned to the left of points A and B, respectively. As seen in FIG. 2, this shifts notches 36 in curve $e_7$ to the left by an amount $\Delta T$ so that the notches are no longer centered in the peaks of the AC input voltage $e_7$. Thus, the peak E at the left hand side of each notch 36 is lower than the peak F at the right hand side of the notch. Because of this, the system draws more power from that portion of the AC input voltage $e_7$ following notch 36 than from the portion preceding the notch, making the overall system appear as a somewhat inductive load to power source 10. Consequently, the system draws higher peak values of line current than are necessary.

If the above problem exists, it may be alleviated by the delay circuit 34 which is included to delay the signal $e_6$ to switch 20 so that notches 36 are centered substantially about the peaks of the waveform of the AC input. Delay circuit 34 can be a conventional delay network and preferably includes provision for separately adjusting the delays of the leading and trailing edges of notch 36.

It is thus evident that the relationship between the input voltage $e_1$ and the input current is adjustable. Since the power factor is determined by this relationship, it follows that the power factor can be controlled.

Still referring to FIG. 1, if power supply 12 includes a power transformer 14, transient damping may be provided. A conventional RC damping network is indicated by dotted lines at 40 between transformer 14 and rectifier and filter 16.

While we have described a regulator which emits a signal to control switch 20 when the triangular signal $e_4$ is below the $e_5$ voltage, the system could just as easily emit them when $e_4$ is above $e_5$. In that case, switch 20 would be normally off.

The elements of switch 20 may be transistors, therefore, the time it takes to turn on or off may be controlled. Since the generation of radiofrequency interference by a switching device is a function of its switching speed, it is important to control the switching time, which capability is present in the regulator 8. In particular, the slower the switching speed, the less the radiofrequency interference generated; however, a tradeoff must be made since a slower switching speed will also increase the dissipation and lower the efficiency.

Figure 3:
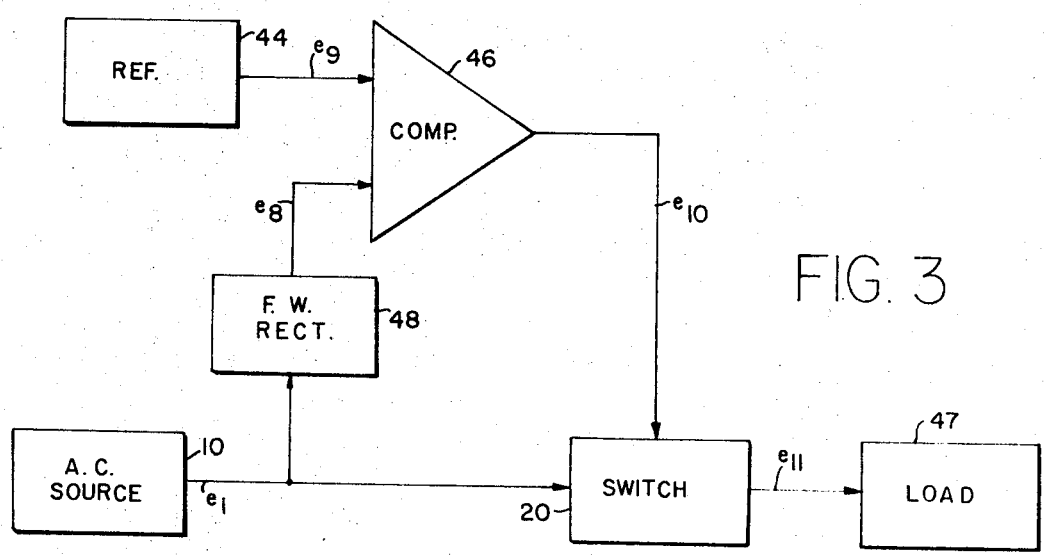
FIG. 3 is a schematic diagram of a circuit for controlling the peak value of an AC waveform.
Figure 4:
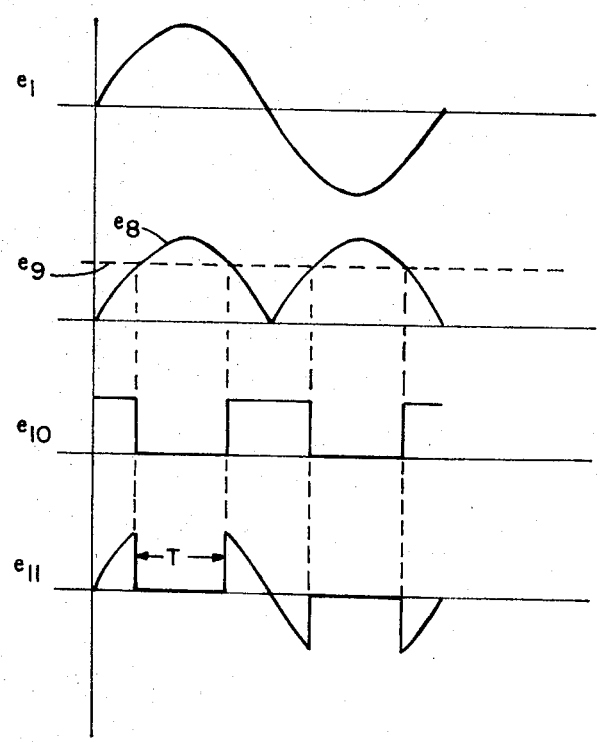
FIG. 4 is a timing diagram illustrating the operation of the FIG. 3 circuit.

An additional embodiment of the invention will now be discussed. Referring to FIGS. 3 and 4, a circuit for controlling the peak value of an AC voltage and an illustrating timing diagram are shown. Utilizing the above-mentioned techniques, the peak voltage from AC source 10 may be controlled in those applications, for instance, where it is desired to limit to a specified peak voltage, that voltage applied to a load 47. The AC source 10 supplies an AC voltage $e_1$ which is rectified by full wave rectifier 48 to produce a voltage waveform represented by $e_8$. A reference source 44, which may be adjustable, produces a DC voltage $e_9$, the magnitude of which is equal to the maximum amplitude to which it is desired that the voltage $e_{11}$ be limited. As is in the previously described embodiment, the comparator 46 produces an output voltage $e_{10}$ of a predetermined magnitude, when and only when voltage $e_8$ is greater than reference voltage $e_9$. Voltage $e_{10}$ will be a 0 level when voltage $e_8$ is less than voltage $e_9$. Voltage $e_{10}$ is then used to control switch 20 in the same manner as was previously discussed such that the output voltage $e_{11}$ is limited to a selected peak value and is now comprised of a notch T. The magnitude of the peak value of voltage $e_{11}$ is inversely related to the width of the notch T.

Figure 6:
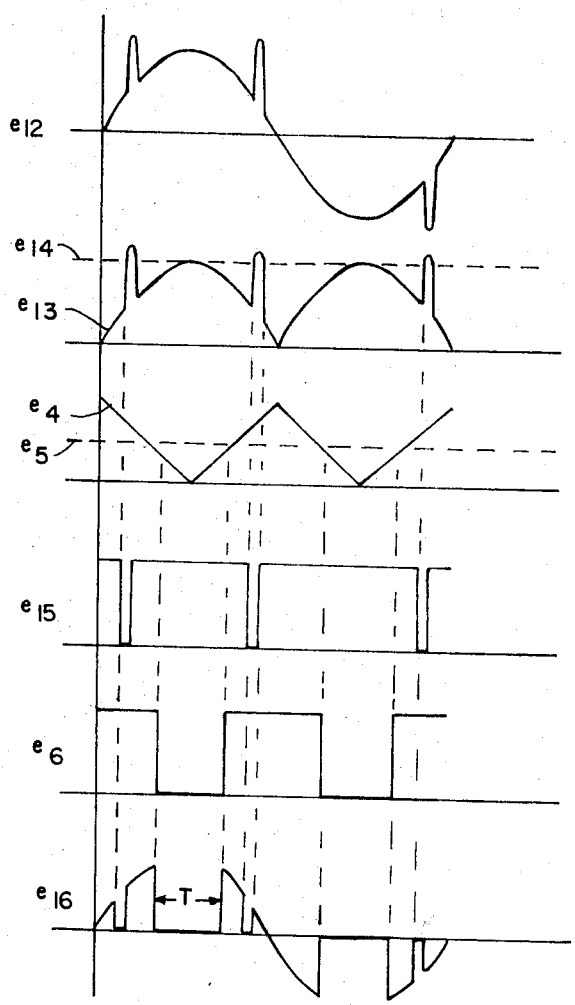

Another embodiment of the invention is shown in FIGS. 5 and 6, whereby circuitry is shown which, in addition to supplying a regulated output to a load 31, as is shown in the system of FIG. 1, also includes a means for limiting the peak voltage of a random appearing voltage superimposed upon the AC voltage of source 10. The AC voltage with randomly occurring peaks is shown as $e_{12}$. Elements 22, 24, 26, 28, 30 and 32 operate in the same manner as was discussed for FIG. 1 in producing waveform $e_6$. Full wave rectifier 26 develops signal $e_{13}$ from AC voltage $e_{12}$. Voltage $e_{13}$ is connected to one input of comparator 54. Reference 52 is connected to the second input of comparator 54 and its output $e_{14}$ is set to that level which the random peak voltages must not exceed. Voltage $e_{15}$, now being developed at the output of comparator 54, includes notches whose width and location are dependent upon the random pulse voltage width and location.

Voltages $e_{15}$ and $e_{16}$ are combined in summing network 50 whose output is connected to control switch 20, thereby producing an output voltage $e_{16}$. As is illustrated, voltage $e_{16}$ now contains center notches T, and in addition, contains randomly occurring notches depending upon the occurrence of the random peak voltages. It can, therefore, be seen that in addition to supplying a voltage regulator which serves a rectifier and filter 16, and thereby controls the recurrent peak voltage of an input AC voltage, it additionally controls the peak value of the AC voltage upon the occurrence of randomly occurring peak voltages.

Another embodiment of this invention is shown in the circuit of FIG. 7 and its timing diagram, illustrated in FIG. 8. Where it is desired to control the peak voltage of an AC voltage, it may be additionally desirable for the system to control the RMS voltage of the AC voltage. In a similar manner, it will be shown that the average voltage of the AC voltage may be controlled. In addition, as is shown in FIG. 7, these different types of regulation may be accomplished while using a regulator comprised of common elements 20, 33, 24 and 26, in addition to other elements. The peak regulation embodiment of this invention has already been discussed, but in general, the voltage across the peak sensitive load 61 is detected by peak voltage detector 60. The peak detected voltage from detector 60 and reference 30 are amplified by differential amplifier 32, thereby producing reference voltage $e_5$. Voltages $e_5$ and $e_4$ are compared in comparator 28 and produce voltage $e_6$ as was previously described. The RMS regulation will now be discussed.

The voltage of reference 64 and the voltage across the RMS sensitive load 71, via RMS detector 72, are connected to differential amplifier 66, thereby producing a DC reference voltage $e_{17}$ which is connected to one input of comparator 62. It is well to note here that the load 71 could have been an average sensitive load, in which case, average voltage regulation could have been accomplished by using an average detector in place of detector 72. The other input to comparator 62, triangular waveform $e_4$, and waveform $e_{17}$ are compared to produce waveform $e_{18}$. Comparator 62 operates, conversely to the comparator 28 in that $e_{18}$ will be a positive level when triangular waveform $e_4$ falls below reference voltage $e_{17}$. Both waveforms $e_{18}$ and $e_6$ are combined in the summing network 74 to control switch 20, thereby producing the voltage waveform $e_{19}$. The voltage waveform $e_{19}$ includes the above-mentioned center notch T, and in addition, includes a notch T' encompassing the 0 axis crossover corresponding to the AC waveform $e_1$. The notch T' occurs each half cycle of AC waveform $e_1$, and the center of notch T' is inversely related to the RMS voltage applied to the RMS sensitive load 71. Center notch T' would be inversely related to the average voltage applied to the load if average voltage regulation were employed.

It is seen from the foregoing then that my improved voltage regulator closely regulates the input to a DC power supply so that the output of the supply remains constant. The regulator employs conventional relatively inexpensive electrical components which are small and lightweight. Also, the regulator is able to operate into a capacitive input filter in the power supply so that there is no need for a heavy input choke. This factor also minimizes the size, weight and cost of the system as a whole. Finally, the regulator is relatively frequency insensitive and produces a minimum among of radiofrequency interference.

It will thus be seen that the objects set forth above, among those made apparent from the preceding description, are efficiently attained, and since certain changes may be made in the above construction without departing from the scope of the invention, it is intended that all matter contained in the above description, or shown in the accompanying drawings, shall be interpreted as illustrative and not in a limiting sense.

I claim:

1. A regulated DC power supply comprising
  A. a DC power supply adapted to accomplish peak rectification,
  B. means for connecting said supply to an AC source,
  C. means for connecting said supply to a load,
  D. a switch connected to interrupt the AC signal applied to said supply, and
  E. a control circuit controlling said switch so as to interrupt the AC signal to said supply during each half cycle of the AC signal creating notches substantially centered in each half cycle of the AC waveform whose width is inversely related to the peak voltage of the AC signal applied to said supply and inversely related to the DC voltage at said load, said control network including
    1. clipping circuit for clipping the AC signal from said source so as to produce a clipped signal,
    2. an integrator for integrating said clipped signal so as to develop a timing signal having positive and negative going voltage ramps,
    3. a rectifier for rectifying the output of said integrator to develop a signal having a triangular waveform having twice the frequency of the AC signal, every other peak of the triangular waveform occurring at the same times as the axis crossings of the AC signal;
    4. a DC reference voltage source,
    5. means for providing a DC return signal indicative of the voltage in said load connecting means,
    6. means for comparing the output of said reference voltage source and said DC return signal to develop a control voltage, and
    7. means for comparing said control voltage and the triangular waveform output of said rectifier so as to develop a difference signal for turning the switch on and off to produce said notches.

2. A regulated DC power supply as defined in claim 1 and further including delay means connected between said comparing means and said switch for delaying the difference signal for said switch to insure that said notches are substantially centered in half cycle of the AC waveform so that said regulated power supply draws current essentially symmetrically about the peak of the AC waveform.

3. A voltage regulator, comprising
  A. a source of alternating voltage,
  B. a load, C. a switch interconnecting said source and said load,
D. means for generating a control voltage,
E. a clipping circuit for clipping the peaks of said alternating voltage to provide a clipped waveform;
F. means for deriving from said clipped waveform a triangular waveform signal, every other peak of which occurs at the same times as the axis crossings of said alternating voltage;
G. a comparator for comparing the amplitude of said triangular signal with that of said control voltage so as to generate a series of output pulses at twice the frequency of said alternating voltage, and
H. means for applying the output pulse series to said switch so as to open said switch during the occurrence of each of said pulses to thereby create notches in each half cycle of said alternating voltage.

4. The voltage regulator defined in c claim 3 wherein said applying means includes for delaying said output pulse series to said switch to insure that said notches are located as desired in each half cycle of said alternating voltage.

5. The voltage regulator defined in claim 3 wherein said load includes a DC power supply connected to the output of said switch.

6. The voltage regulator defined in claim 5 wherein
A. said control voltage is proportional to the voltage at the output of said power supply,
B. said comparing means includes a reference, related to the peak magnitude of said alternating voltage, such that said comparing means generates said series of output pulses when the instantaneous peak amplitude of a preselected one of said voltages exceeds the peak related amplitude of the other, and
C. said applying means creates said notches substantially centered on the peak amplitude of said alternating voltage and the width of said pulses controls the width of said notches whereby said width of said notches is inversely related to the peak voltage of the output signal from said regulator.

7. The voltage regulator defined in claim 5 wherein said deriving means further includes
A. an integrator for integrating the signal from said clipping circuit so as to develop a train of positive and negative going voltage ramps, and in which a full wave rectifier is connected to rectify the alternating voltage as shaped by said clipping circuit and said integrator so as to generate said signal having a triangular waveform, and in which said comparator emits said output whenever the triangular signal from said rectifier falls below said control voltage.

8. The voltage regulator defined in claim 7 wherein
A. said control voltage varies in response to changes in the voltage at the output of said power supply so as to vary the width of said notches to compensate for said changes, and
B. said applying means creates said notches substantially centered on the peak amplitude of said alternating voltage and the width of said pulses controls the width of said notches whereby said width of said notches is inversely related to the peak voltage of the output signal of said regulator.

9. Apparatus as defined in claim 5 wherein said control voltage generating means responds to changes in the voltage at the output of said DC supply so as to alter the signal applied to said switch varying the width of said notches as needed to compensate for said voltage changes.

10. A regulated DC power supply as defined in claim 5 and further including means for damping transients developed in said power supply.